United States Patent
Leake et al.

[11] Patent Number: 5,260,842
[45] Date of Patent: * Nov. 9, 1993

[54] DATA SEPARATOR HAVING AN ACCURATE DELAY CIRCUIT

[75] Inventors: William W. Leake; Thomas J. Skaar, both of Eagan, Minn.

[73] Assignee: VTC Inc., Bloomington, Minn.

[*] Notice: The portion of the term of this patent subsequent to Nov. 2, 2010 has been disclaimed.

[21] Appl. No.: 869,435

[22] Filed: Apr. 16, 1992

[51] Int. Cl.⁵ .............................................. G11B 5/09
[52] U.S. Cl. ....................................... 360/51; 360/48; 360/53; 375/110
[58] Field of Search ................ 360/51, 53, 45, 24, 360/31, 46, 26, 36.1, 36.2, 40, 48, 43, 39; 375/56, 82, 110, 118, 119

[56] References Cited

U.S. PATENT DOCUMENTS

| | | | |
|---|---|---|---|
| 4,394,695 | 7/1983 | Mahon | 360/53 |
| 4,420,776 | 12/1983 | Jove et al. | 360/45 |
| 4,517,610 | 5/1985 | Minuhin | 360/24 |
| 4,520,408 | 5/1985 | Velasquez | 360/51 |
| 4,534,044 | 8/1985 | Funke et al. | 375/120 |
| 4,726,022 | 2/1988 | Chan et al. | 371/5 |
| 4,791,488 | 12/1988 | Fukazawa et al. | 358/149 |
| 4,809,088 | 2/1989 | Lofgren et al. | 360/31 |
| 4,811,125 | 3/1989 | Sengoku | 360/51 |
| 4,837,643 | 6/1989 | Tierney, III | 360/51 |
| 4,851,932 | 7/1989 | Scheer et al. | 360/51 |
| 4,875,108 | 10/1989 | Minuhin et al. | 360/51 |
| 4,901,035 | 2/1990 | Cleveland | 331/14 |
| 4,922,141 | 5/1990 | Lofgren et al. | 307/595 |
| 4,958,243 | 9/1990 | Chen et al. | 360/51 |
| 4,970,609 | 11/1990 | Cunningham et al. | 360/51 |
| 5,170,297 | 12/1992 | Wahler et al. | 360/51 |

Primary Examiner—Robert J. Pascal
Assistant Examiner—Ali Neyzari
Attorney, Agent, or Firm—Kinney & Lange

[57] ABSTRACT

A data separator which extracts data embedded in a read signal includes a delay circuit that is controlled by a frequency synthesizer. The frequency synthesizer provides a write clock during write operations. A controlled oscillator included in the frequency synthesizer resides on a common integrated circuit with the delay circuit. Because component fabrication variations tend to track on a common integrated circuit, the frequency synthesizer compensates for fabrication variations in the delay circuit, thereby producing an accurate delay interval.

22 Claims, 9 Drawing Sheets

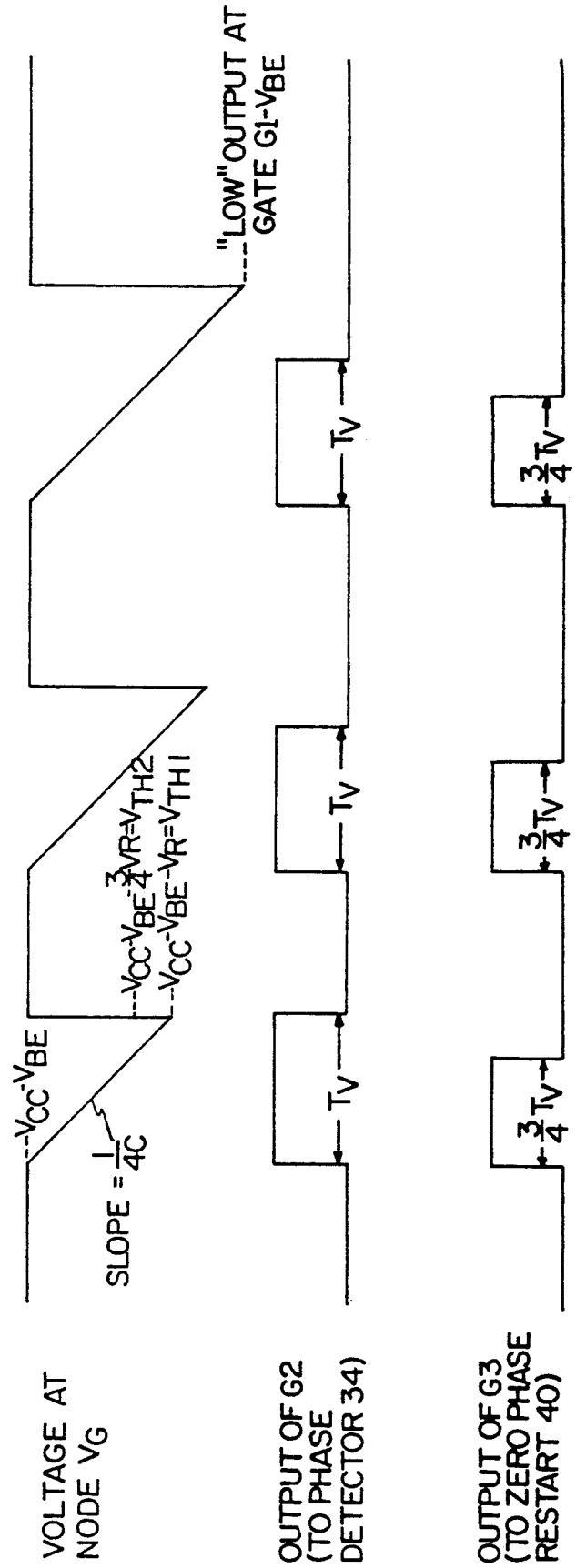

DATA SEPARATOR HAVING AN ACCURATE DELAY CIRCUIT

BACKGROUND OF THE INVENTION

The present invention relates to an accurate delay circuit for use in reading data from a disk drive. More particularly, the present invention relates to an accurate delay circuit which is used to anticipate a phase comparison and initiate a zero phase restart.

In the art of data recording, data is stored in a disk drive system by positioning a read/write transducer head proximate a rotating magnetic disk. A write signal is applied to the read/write head causing the head to emit a transient magnetic field, which creates a series of magnetic polarizations on the disk surface. The write signal is created by synchronizing the data to be written with a write clock signal. Typically, the write clock signal itself is not written to the disk surface.

When reading data from the disk, the read/write head passes over the magnetic polarizations. This induces a transducer signal in the read/write head. The transducer signal is processed to form a read signal. Because the write clock signal which originally synchronized the data is not itself written to the disk, a read clock signal must be recreated to frame the data embedded in the read signal. The read clock signal must compensate for variations in the rate at which data is read from the disk. These variations are typically caused by imperfections in the servo mechanism that rotates the disk, and by vibrations.

It is known in the art to utilize a phase locked loop to create a read clock signal which can frame the data embedded in the read signal. A typical phase locked loop is comprised of a voltage controlled oscillator (VCO), a phase detector, a charge pump and a loop filter. The VCO receives an input voltage and produces an output signal having a frequency which varies with the magnitude of the input voltage. A read clock signal is derived from the VCO output signal (typically by applying the VCO output signal to a frequency divider). The phase detector compares the phase of the read clock signal with the phase of the read signal.

If the phase of the read clock signal lags the phase of the read signal, the phase detector will issue a pump-up signal to the charge pump. The pump-up signal raises the voltage delivered to the VCO input, thereby raising the frequency of the VCO output signal and the read clock signal. If the phase of the VCO output signal leads the phase of the read signal, then the phase detector will issue a pump-down signal to the charge pump. The pump-down signal lowers the voltage supplied to the VCO, thereby lowering the frequency of the VCO output signal and the read clock signal. Accordingly, the read clock signal will eventually lock on to the read signal.

By itself, the phase locked loop described above will not create a read clock signal suitable for framing data embedded in a read signal. The read signal will not contain a transition every clock period, and therefore, the phase detector cannot determine when to perform a phase comparison. If the phase detector attempted to perform a phase comparison when it detected a transition in the read signal, it could perform a proper comparison only if the phase of the read signal led the phase of the read clock signal. When the phase of the read signal lags the phase of the read clock signal, the phase detector will miss the phase comparison because the transition in the read clock signal will have already occurred when the phase detector is signaled to perform a phase comparison. This would cause the phase detector to perform a phase comparison on the next transition of the read clock signal, and the phase detector would incorrectly determine that the phase of the read clock signal lagged the phase of the read signal. Accordingly, the phase locked loop described above must be provided with a mechanism which performs a phase comparison on the appropriate transition of the read clock signal whenever a transition occurs in the read signal.

It is known in the art to provide the phase locked loop described above with a delay circuit which delays the read signal by a time interval related to the expected rate at which data is read from the disk. The delay circuit allows every transition in the read signal from one voltage level to another voltage level to trigger a phase comparison. When a transition is present in the read signal, the transition is detected before being delayed by the delay circuit. Based on this initial detection, the phase detector is signaled to perform a phase comparison. The phase comparison is then performed on the delayed read signal, thereby allowing the phase detector to perform a phase comparison regardless of whether the phase of the read clock signal leads or lags the phase of the read signal.

Typical delay circuits include RC circuits and circuits comprised of a string of inverters. An RC delay circuit typically has a delay based on a time interval required for a capacitance to charge from one voltage level to another voltage level. A delay circuit based on a string of inverters has a delay interval equal to the propagation delay of each inverter multiplied by the number of inverters.

The accuracy of the delay circuit is critical. If the delay is significantly in error, the phase detector will compare a transition in the delayed read signal with an incorrect transition in the read clock signal. Designing an accurate delay circuit has proven to be challenging, particularly in integrated circuit environments where component values typically vary by 20 percent due to fabrication variations.

With the advent of zone density recording, not only must the delay circuit be accurate, it must also be variable. In a typical disk drive not having zone density recording, the disk surface is divided into tracks and sectors. Tracks are defined as concentric rings of the disk surface. Sectors are defined by equally dividing tracks by lines extending radially outward from the center of the disk surface. Each sector traverses an arc equal to arcs traversed by the other sectors. Accordingly, sectors on the edge of the disk surface contain more recording media than sectors close to the center of the disk surface. Because the rate at which data is written to the disk surface remains constant, recording media on the outer edge of the disk surface is not used as efficiently as recording media near the center of the disk surface.

In zone density recording, the rate at which data is written to the disk surface varies with the radial distance at which data is written. Data written near the center of the disk surface is written at a slower rate than data written near the outer edge of the disk surface, thereby utilizing the outer tracks of the disk surface more efficiently. Unfortunately, zone density complicates the design of read/write circuitry, including the delay circuit.

An accurate delay circuit for use in integrated circuit environments was disclosed by Lofgren et al in U.S. Pat. No. 4,922,141. The delay circuit disclosed by Lofgren et al is comprised of a crystal oscillator, a phase detector and first and second variable delay circuits. A reference frequency signal provided by the crystal oscillator is applied to the first variable delay circuit. The phase detector compares the phase of the delayed signal from the first variable delay circuit with the phase of the reference frequency signal. An error signal generated by the phase detector is applied to the first variable delay circuit, thereby forming a phase locked loop. The phase detector causes the two signals to become in-phase by varying the error signal, which varies the delay of the first delay circuit until the delay interval equals one oscillation period of the reference signal.

The error signal is also applied to the second delay circuit. Since both delay circuits are located on the same integrated circuit, deviations in their respective component values will track. Therefore, the second delay is provided with a delay having an accurate relationship to the delay of the first delay circuit, which is equal to the oscillation period of the oscillator.

SUMMARY OF THE INVENTION

The present invention is a data separator having an accurate delay circuit. The delay circuit utilized in the present invention has a delay interval which is controlled by a frequency synthesizer. When data is being written to a disk surface, the frequency synthesizer provides a write clock to synchronize write data. However, when data is being read from the disk surface, the frequency synthesizer is available to control the delay interval of the delay circuit. A controlled oscillator included in the frequency synthesizer resides on a common integrated circuit with the delay circuit.

The data separator is comprised of a first controlled oscillator, a variable delay circuit, a first phase detector and a data extractor. The frequency synthesizer is comprised of a reference frequency generator, a second controlled oscillator and a second phase detector.

A delay control signal is produced which is representative of a magnitude of a frequency control signal required to cause the second controlled oscillator to oscillate at a frequency which is precisely related to the reference frequency. The delay control signal inherently compensates for on-chip fabrication variations through the action of a phase locked loop and accurately controls the variable delay circuit to produce an accurate delay interval.

BRIEF DESCRIPTION OF THE DRAWINGS

FIG. 9 is a timing diagram showing the voltage present at certain circuit nodes of the delay circuit of FIG. 1.

DETAILED DESCRIPTION OF THE PREFERRED EMBODIMENTS

Figure 1:
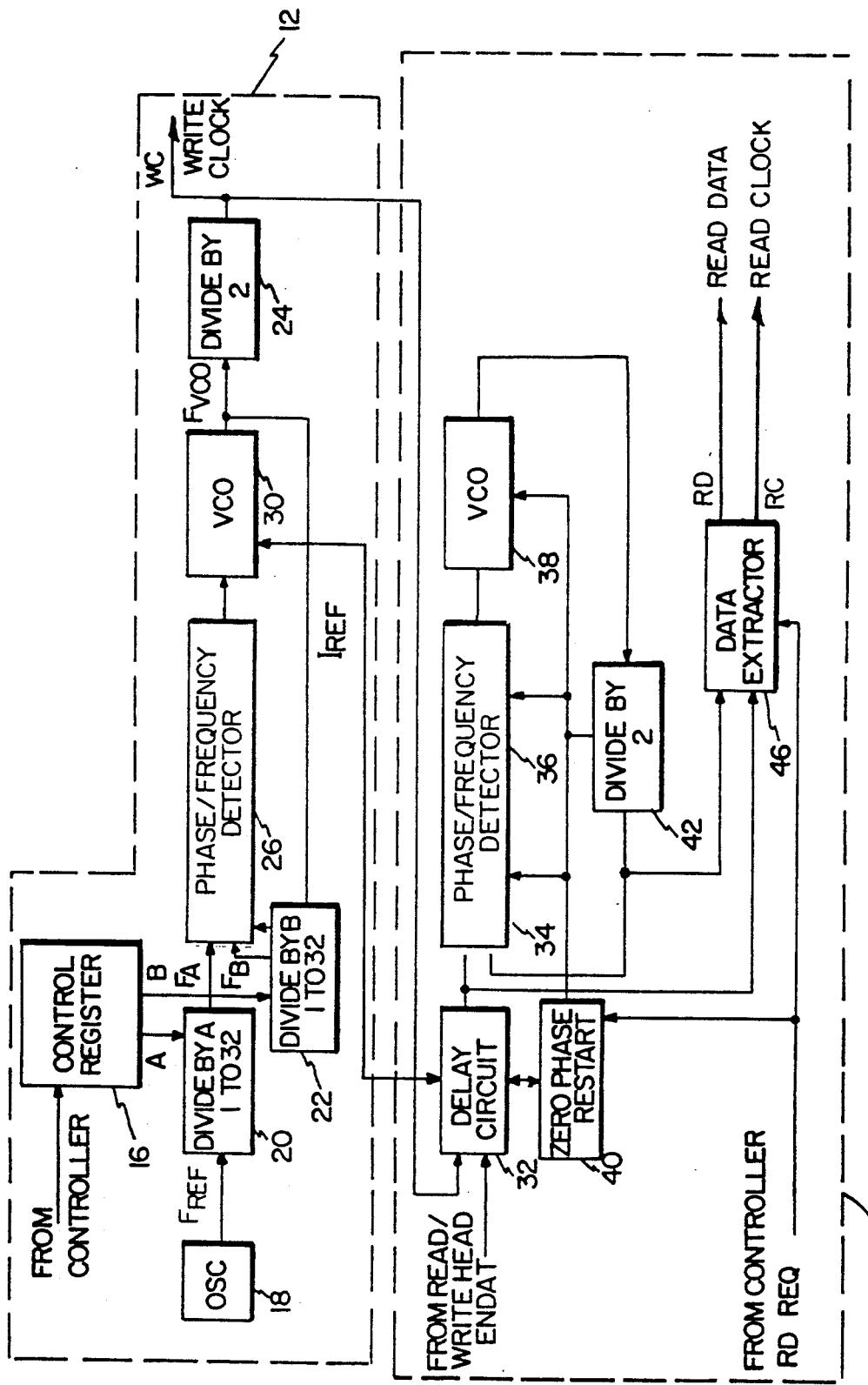
FIG. 1 is a simplified block diagram showing a data separator and a frequency synthesizer, all of which are part of a disk drive system.

FIG. 1 is a simplified block diagram showing data separator 10 and frequency synthesizer 12, all of which are part of a disk drive system. Data separator 10 and frequency synthesizer 12 are on a common integrated circuit. The remainder of the disk drive system is not shown in FIG. 1. Data separator 10 receives a read request signal (RD_REQ) from a disk drive controller and subsequently processes a read signal (ENDAT) which is derived from a transducer signal which originates from a read/write transducer head. The ENDAT signal contains data and clock information. The RD_REQ signal is asserted by the controller when valid data is available in the ENDAT signal. Data separator 10 extracts and decodes data from the ENDAT signal and provides read data signal RD and read clock signal RC to other circuitry (not shown in FIG. 1) for additional processing.

Frequency synthesizer 12 provides write clock signal WC, which is used by other circuitry (not shown in FIG. 1) during write operations. Frequency synthesizer 12 includes control register 16, reference oscillator 18, dividers 20, 22 and 24, phase/frequency detector 26 and voltage controlled oscillator (VCO) 30. Control register 16 is coupled to the controller and stores integers A and B. A and B are each represented by five data bits and therefore can each assume a value between one and thirty-two. Integer A is supplied to divider 20 and integer B is supplied to divider 22. Divider 20 receives a reference frequency signal ($F_{REF}$) from reference oscillator 18 and produces a signal ($F_A$) having a frequency:

$$F_A = \frac{F_{REF}}{A} \qquad \text{Eq. 1}$$

Divider 22 receives an output ($F_{VCO}$) signal from VCO 30 and produces a signal ($F_B$) having a frequency:

$$F_B = \frac{F_{VCO}}{B} \qquad \text{Eq. 2}$$

VCO 30 produces the signal $F_{VCO}$, which has a frequency that varies with the magnitude of the voltage supplied by phase/frequency detector 26. Phase/frequency detector 26 compares the phase of signal $F_A$ with the phase of signal $F_B$. If the phase of $F_A$ lags the phase of $F_B$, phase/frequency detector 26 lowers the voltage provided to VCO 30. If the phase of $F_A$ leads the phase of $F_B$, phase/frequency detector 26 raises the voltage provided to VCO 30.

The continuous comparisons performed by phase/frequency detector 26 will eventually cause the frequency of $F_B$ to lock on to, and therefore equal the frequency of $F_A$. Since:

$$F_A = \frac{F_{REF}}{A},\quad \text{Eq. 3}$$

$$F_B = \frac{F_{VCO}}{B}\quad \text{Eq. 4}$$

and $$F_A = F_B \quad \text{Eq. 5}$$

it follows that:

$$F_{VCO} = \frac{B \cdot F_{REF}}{A}.\quad \text{Eq. 6}$$

Accordingly, by changing A and B, the controller can accurately vary the frequency provided by frequency synthesizer 12. This capability is required for zone density recording. In zone density recording, the rate at which data is written to and read from the disk surface varies with the radial position of the read/write transducer head. In general, values for A and B are predetermined for any particular radial position. The same values for A and B are used during both read and write operations.

The primary function performed by frequency synthesizer 12 is to provide a write clock signal when writing to the disk. In contrast, data separator 10 recreates a read clock signal when reading from the disk. Data separator 10 is comprised of delay circuit 32, phase/frequency detector 34, voltage controlled oscillator (VCO) 38, zero phase restart 40, divider 42 and data extractor 46.

Delay circuit 32 provides a variable delay of the ENDAT signal to phase/frequency detector 34 and zero phase restart 40. The delay is controlled by the signal $I_{REF}$, which is produced by VCO 30. When data separator 10 is in idle mode, phase/frequency detector 34 is operated in "phase/frequency" mode and a multiplexer in delay circuit 32 connects delay circuit 32 to the output of divider 24. In "phase/frequency" mode, phase/frequency detector 34 controls VCO 38 to cause the output of divider 42 to achieve the same phase and frequency as the output of divider 24. This allows the data separator to remain locked onto a signal having a frequency extremely close to the frequency of an impending read signal, which helps data separator 10 to quickly lock onto the read signal.

When delay circuit 32 is not in idle mode, phase/frequency detector 34 is operated in "phase only" mode. In phase only mode, phase/frequency detector 34 only performs a phase comparison when it is signaled to do so, and controls VCO 38 based on non-periodic phase comparisons.

Phase/frequency detector 34, VCO 38 and divider 42 form a phase locked loop. Phase/frequency detector 34 is signaled to perform a phase comparison when a transition from one voltage level to another voltage level in the ENDAT signal is detected entering delay circuit 32. Then phase/frequency detector 34 compares the phase of the signal delayed by delay circuit 32 with the phase of the signal from divider 42. Divider 42 divides the output signal of VCO 38 by two. VCO 38 produces a signal having a frequency which varies with the magnitude of the voltage provided by phase/frequency detector 34. Based on continuous phase comparisons, phase/frequency detector 34 will either raise of lower the voltage provided to VCO 38 to cause the output signal of divider 42 to become in-phase with the signal from delay circuit 32.

In the embodiment described herein, phase/frequency detector 34 compares a high-to-low transition in the signal from delay circuit 32 with a high-to-low transition in the signal from divider 42. In other embodiments, a low-to-high transition is compared to a high-to-low transition, a high-to-low transition is compared to a low-to-high transition and a low-to-high transition is compared to a low-to-high transition. The word "in-phase" encompasses these phase relationships, along with any other fixed phase relationship.

The output signals from divider 42 and delay circuit 32 are also provided to data extractor 46. Data extractor 46 uses the signal from divider 42 as a read clock signal to frame and extract data from the output of delay circuit 32 and provides read data signal RD and read clock signal RC to other circuitry (not shown in FIG. 1) for additional processing.

Zero phase restart 40 is provided to assist the phase locked loop in initially looking onto a read signal. The operation of zero phase restart 40 will be explained with reference to the timing diagram shown in FIG. 2.

Figure 2:
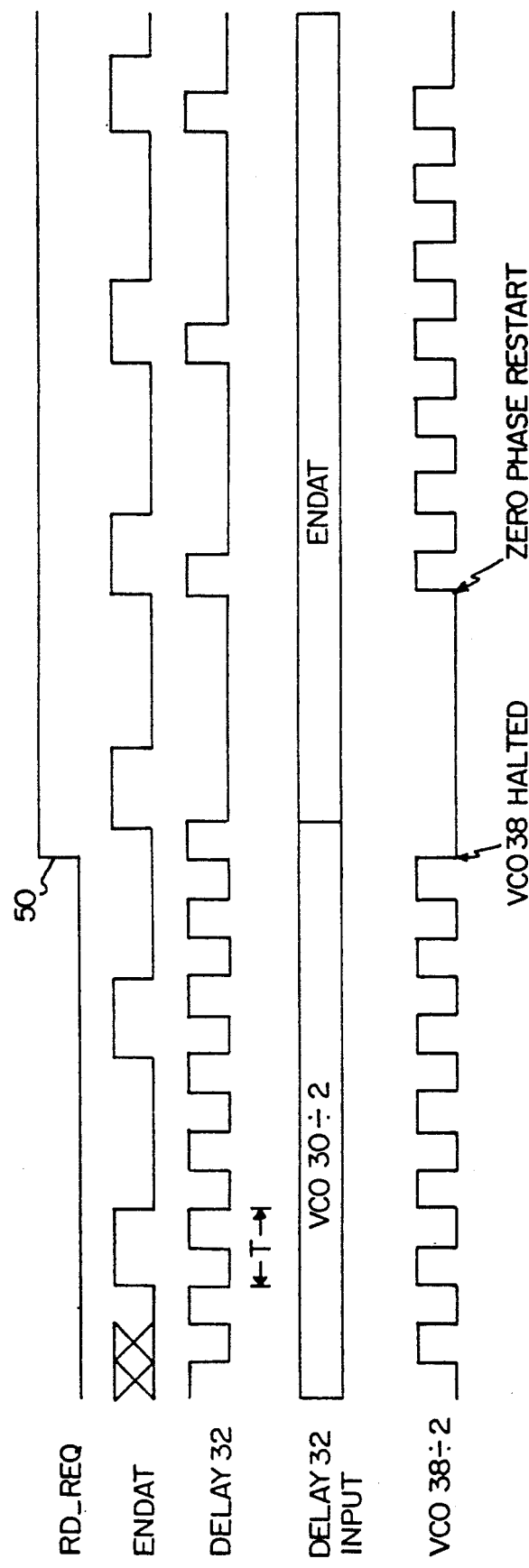
FIG. 2 is a timing diagram showing various output signals of the data separator and frequency synthesizer of FIG. 1.

FIG. 2 is a timing diagram showing the output signals of delay circuit 32 and divider 42 (labeled as Delay 32 and VCO 38 ÷2, respectively) and the signals RD_REQ and ENDAT. Also shown in FIG. 2 is the input signal provided to delay circuit 32.

When the disk controller prepares to read data from the disk, it positions the read head above the desired track, detects a valid signal and asserts the RD_REQ signal. The RD_REQ signal is asserted in FIG. 2 at edge 50.

Before RD_REQ is asserted, delay circuit 32 is coupled to the output of divider 24 of frequency synthesizer 12 (VCO 30÷2). As previously described, integers A and B of control register 16 determine the oscillation frequency of frequency synthesizer 16. Since integers A and B are predetermined for any particular radial position on the disk surface and the output of divider 42 tracks the output of divider 24, VCO 38 oscillates at a frequency extremely close to the frequency at which it will operate when reading data.

After RD_REQ is asserted and upon detecting the next transition from one voltage level to another voltage level in the ENDAT signal, zero phase restart 40 halts VCO 38 and switches the input of delay circuit 32 to the ENDAT signal. Although VCO 38 is stopped, phase/frequency detector 34 continues to provide the same voltage level which caused VCO 38 to oscillate at the same frequency as VCO 30, so that VCO 38 will initially oscillate at this frequency when it is restarted. This frequency will be extremely close to the frequency at which data will be read from the disk. When zero phase restart 40 detects the next transition form one voltage level to another voltage level in the ENDAT signal, it restarts VCO 38 in-phase with the signal from delay circuit 32.

The accuracy of delay circuit 32 is critical. If the delay is in error, phase/frequency detector 34 may perform a phase comparison on the wrong edge of the output of divider 42. Also, zero phase restart 40 may restart VCO 38 at the wrong time, thereby creating a phase error which the phase locked loop will require extra time to correct.

Figure 3:
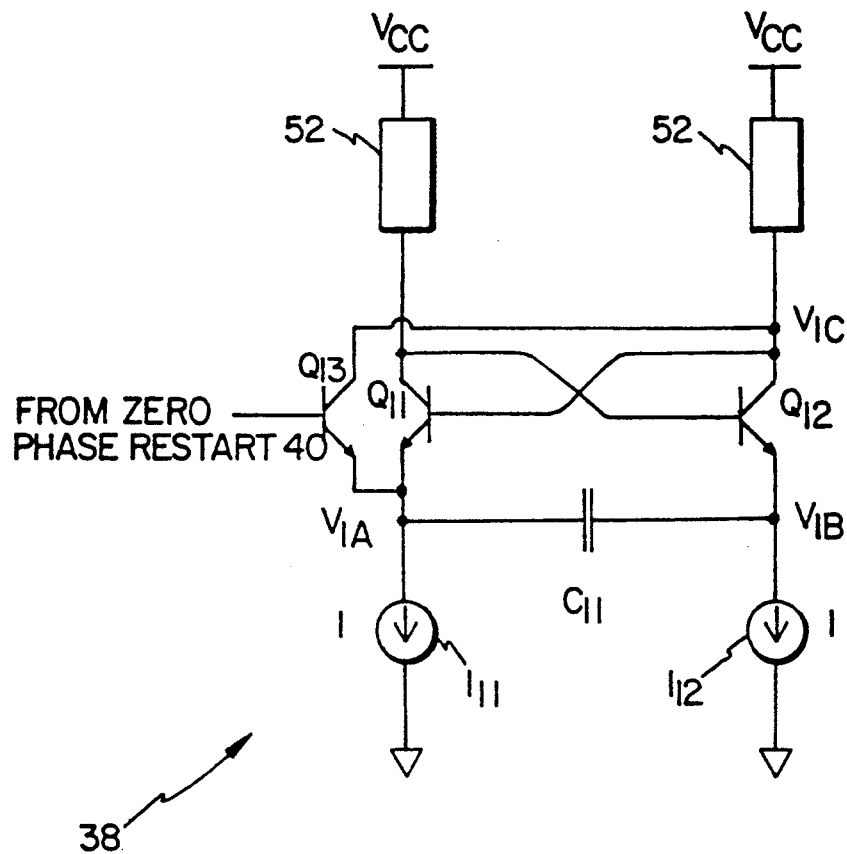
FIG. 3 is a simplified transistor level diagram showing an embodiment of a voltage controlled oscillator (VCO), which is part of the data separator of FIG. 1.
Figure 4:
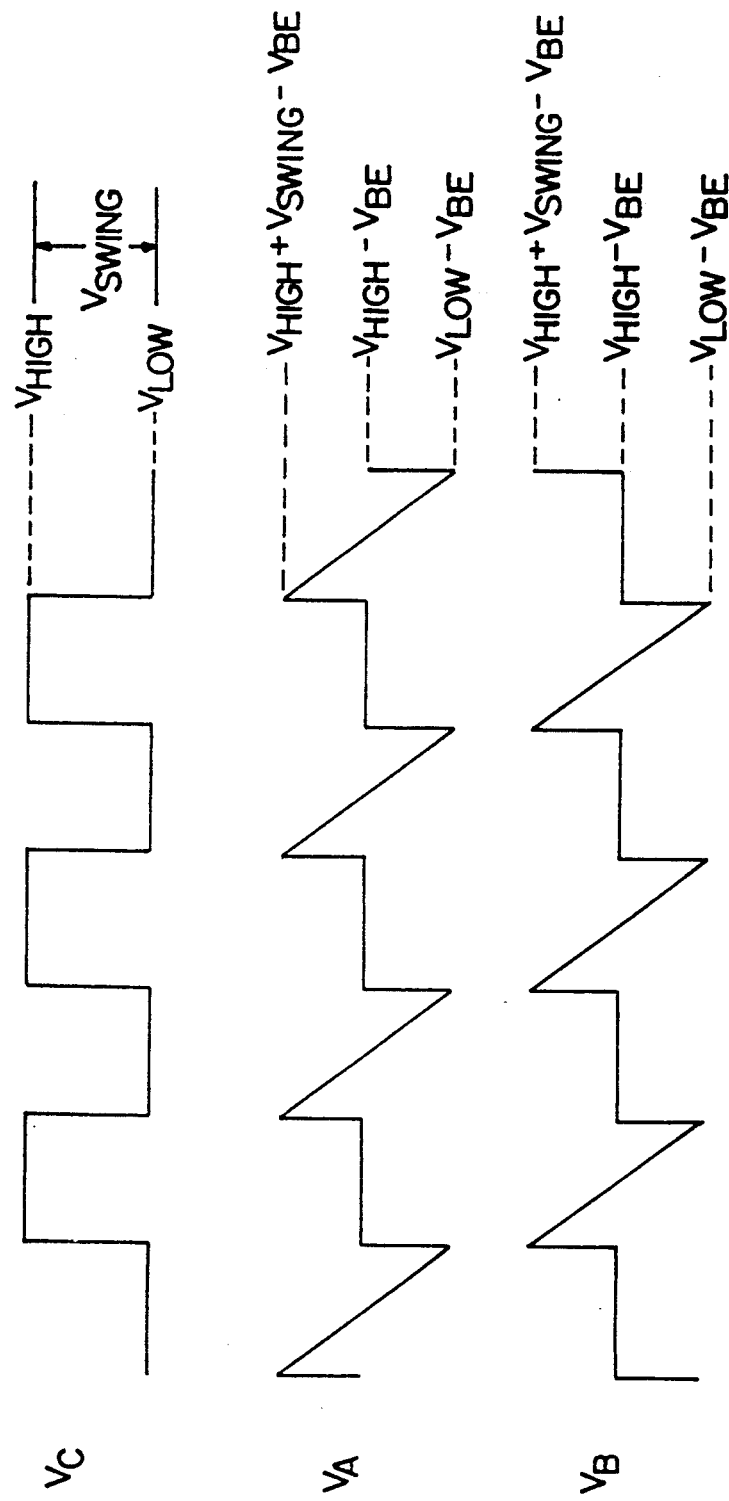
FIG. 4 is timing diagram showing the voltages present at certain circuit nodes of the VCO of FIG. 3.

Zero phase restart 40 and phase/frequency detector 34 require different delays from delay circuit 32. Phase/frequency detector 34 requires a delay approximately equal to one period of oscillation of VCO 38, or equivalently, one-half of a period of the signal provided by divider 42. Zero phase restart 40 requires a delay smaller than the delay required by phase/frequency detector 34. With reference to FIGS. 3 and 4, it will be shown that the delay required by zero phase restart 40 is three-fourths the delay required by phase/frequency detector 34.

FIG. 3 is a simplified transistor level diagram showing an embodiment of VCO 38 of FIG. 1. In this Figure, VCO 38 is comprised of load networks 52, transistors $Q_{11}$, $Q_{12}$, and $Q_{13}$, capacitor $C_{11}$ and current supplies $I_{11}$ and $I_{12}$. $I_{11}$ and $I_{12}$ each provide a current I. FIG. 4 is timing diagram showing the voltages present at circuit nodes $V_{1A}$, $V_{1B}$ of $V_{1C}$ of VCO 38.

The output of VCO 38 is derived from the voltage found at circuit node $V_{1C}$. When the signal from zero phase restart 40 is low, $V_{1C}$ oscillates between $V_{HIGH}$ and $V_{LOW}$, as shown in FIG. 4. The difference between $V_{HIGH}$ and $V_{LOW}$ is $V_{SWING}$, which is determined by load networks 52.

When $V_{1C}$ is equal to $V_{HIGH}$, transistor $Q_{11}$ is on and transistor $Q_{12}$ is off. Accordingly, the voltage at $V_{1A}$ is equal to $V_{HIGH}$ minus the base-to-emitter drop of transistor $Q_{11}$, or:

$$V_{1A} = V_{HIGH} - V_{BE}.\qquad\text{Eq. 7}$$

Because transistor $Q_{12}$ is off, current source $I_{12}$ must pull current I through capacitor $C_{11}$. This will cause the voltage at point $V_{1B}$ to swing from:

$$V_{HIGH} + V_{SWING} - V_{BE}\qquad\text{Eq. 8}$$

(the point at which transistor $Q_{11}$ turns on and transistor $Q_{12}$ turns off) to:

$$V_{LOW} - V_{BE}\qquad\text{Eq. 9}$$

(the point at which transistor $Q_{11}$ turns off and transistor $Q_{12}$ turns on). When transistor $Q_{11}$ turns off and transistor $Q_{12}$ turns on, $V_{1C}$ switches from $V_{HIGH}$ to $V_{LOW}$, and the voltage swing just observed at node $V_{1B}$ is repeated at node $V_{1A}$. This cycle will continuously repeat, thereby providing a stable oscillator output at point $V_{1C}$.

Figure 5:
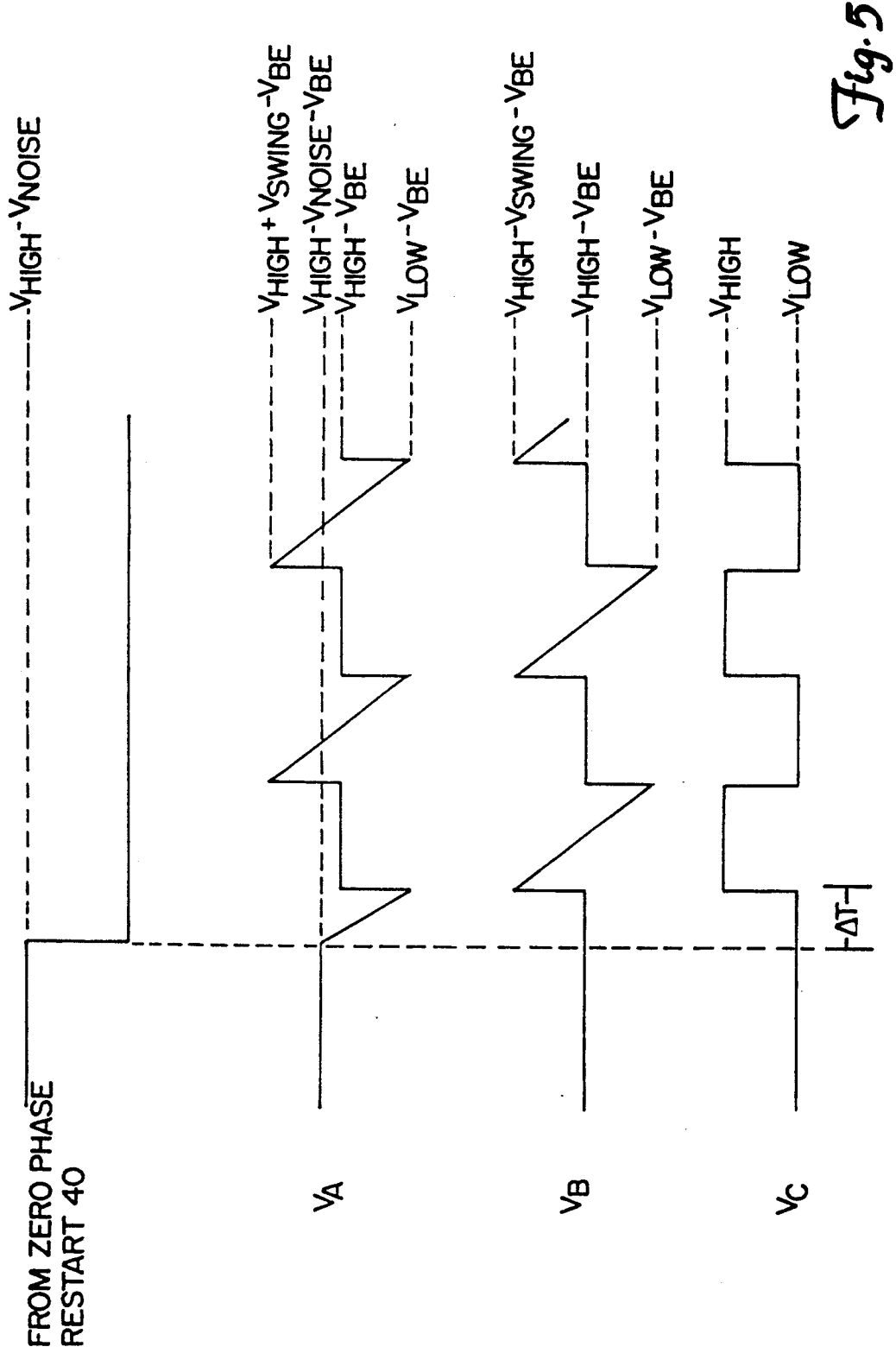
FIG. 5 is a timing diagram showing the voltages present at certain circuit nodes of the VCO of FIG. 3 as the VCO is restarted.

FIG. 5 is a timing diagram showing the voltages at nodes $V_{1A}$, $V_{1B}$, and $V_{1C}$ as VCO 38 is restarted by releasing the signal from zero phase restart 40. In FIG. 5, the zero phase restart signal is initially high. When this signal is high, transistors $Q_{13}$ and $Q_{12}$ of FIG. 3 are on and transistor $Q_{11}$ is off. The regenerative feedback path between transistors $Q_{11}$ and $Q_{12}$ is broken and the voltages at nodes $V_{1A}$ and $V_{1B}$ are clamped. Zero phase restart 40 must provide a voltage of at least $V_{HIGH}$ to stop VCO 38. The actual voltage provided by zero phase restart 40 is:

$$V_{HIGH} + V_{NOISE}\qquad\text{Eq. 10}$$

where $V_{NOISE}$ is a voltage sufficient to mask any noise the circuit and prevent transistor $Q_{11}$ from turning on.

When the signal from zero phase restart 40 is high, the voltage at node $V_{1C}$ is $V_{LOW}$. The voltage at node $V_{1A}$ is equal to the voltage of the zero phase restart signal minus the base-to-emitter drop of transistor $Q_{13}$, or equivalently:

$$V_{A1}V_{HIGH} + V_{NOISE} - V_{BE}.\qquad\text{Eq. 11}$$

The voltage at node $V_{1B}$ is:

$$V_{B1} = V_{HIGH} - V_{BE},\qquad\text{Eq. 12}$$

which is the same voltage that is present at $V_{1B}$ when VCO 38 is oscillating and transistor $Q_{12}$ is on.

As the signal from zero phase restart 40 goes low, transistor $Q_{13}$ turns off. Transistor $Q_{12}$ remains on and transistor $Q_{11}$ remains off. Accordingly, the voltage at node $V_{1C}$ remains at $V_{LOW}$ and the voltage at node $V_{1B}$ remains at:

$$V_{HIGH} - V_{BE}.\qquad\text{Eq. 13}$$

However, the current provided by current source $I_{11}$ must now pass through capacitor $C_{11}$ because transistor $Q_{13}$ is off. The voltage at node $V_{1A}$ begins dropping from:

$$V_{HIGH} + V_{NOISE} + V_{BE}\qquad\text{Eq. 14}$$

until it reaches:

$$V_{LOW} - V_{BE}.\qquad\text{Eq. 15}$$

At this point, transistor $Q_{11}$ turns on, transistor $Q_{12}$ turns off, the voltage at node $V_{1C}$ switches from $V_{LOW}$ to $V_{HIGH}$ and VCO 38 resumes oscillation.

In FIG. 5, the time interval between the high-to-low transition of the zero phase restart signal and the low-to-high transition in the voltage at node $V_{1C}$ is shown as $\Delta T$. $\Delta T$ is equal to the time it takes for the voltage at node $V_{1A}$ to drop from:

$$V_{HIGH} + V_{NOISE} - V_{BE}\qquad\text{Eq. 16}$$

to:

$$V_{LOW} - V_{BE}.\qquad\text{Eq. 17}$$

To derive an approximate value for $\Delta T$, it can be assumed that $V_{NOISE}$ is zero. As seen in FIGS. 4 and 5, the length of time required for the voltage at node $V_{1A}$ to drop from:

$$V_{HIGH} - V_{BE}\qquad\text{Eq. 18}$$

to:

$$V_{LOW} - V_{BE}\qquad\text{Eq. 19}$$

is equal to one-fourth of a VCO 38 oscillation period. Therefore, $\Delta T$ is approximately equal to one-fourth of a VCO 38 oscillation period, and more accurately, one-fourth of a period plus the time required for the voltage at node $V_{1A}$ to drop by $V_{NOISE}$.

Accordingly, zero phase restart 40 of FIG. 1 must provide a restart signal to VCO 38 approximately one-fourth of a VCO 38 oscillation period before a transition in the signal provided to phase/frequency detector 34 by delay circuit 32. Therefore, delay circuit 32 must delay the signal sent to zero phase restart 40 by approximately three-fourths of a VCO 38 oscillation period.

As described above, delay circuit 32 provides different delays to phase/frequency detector 34 and zero phase restart 40. While these delays are different, they are related by the oscillation period of VCO 38. These delays must also be variable, in accordance with the requirements of zone density recording. To vary the delays, integers A and B of dividers 20 and 22 are set to the predetermined values required for the radial position at which data is being read from the disk. Accordingly, VCO 30 will oscillate at the same frequency as it did when the data was written to the disk. A reference current $I_{REF}$ is provided to delay circuit 38 from VCO 30. Based on the reference current $I_{REF}$, delay circuit 32 provides delays which are related to the oscillation period of VCO 30, which is the same as the expected oscillation period of VCO 38.

Figure 6:
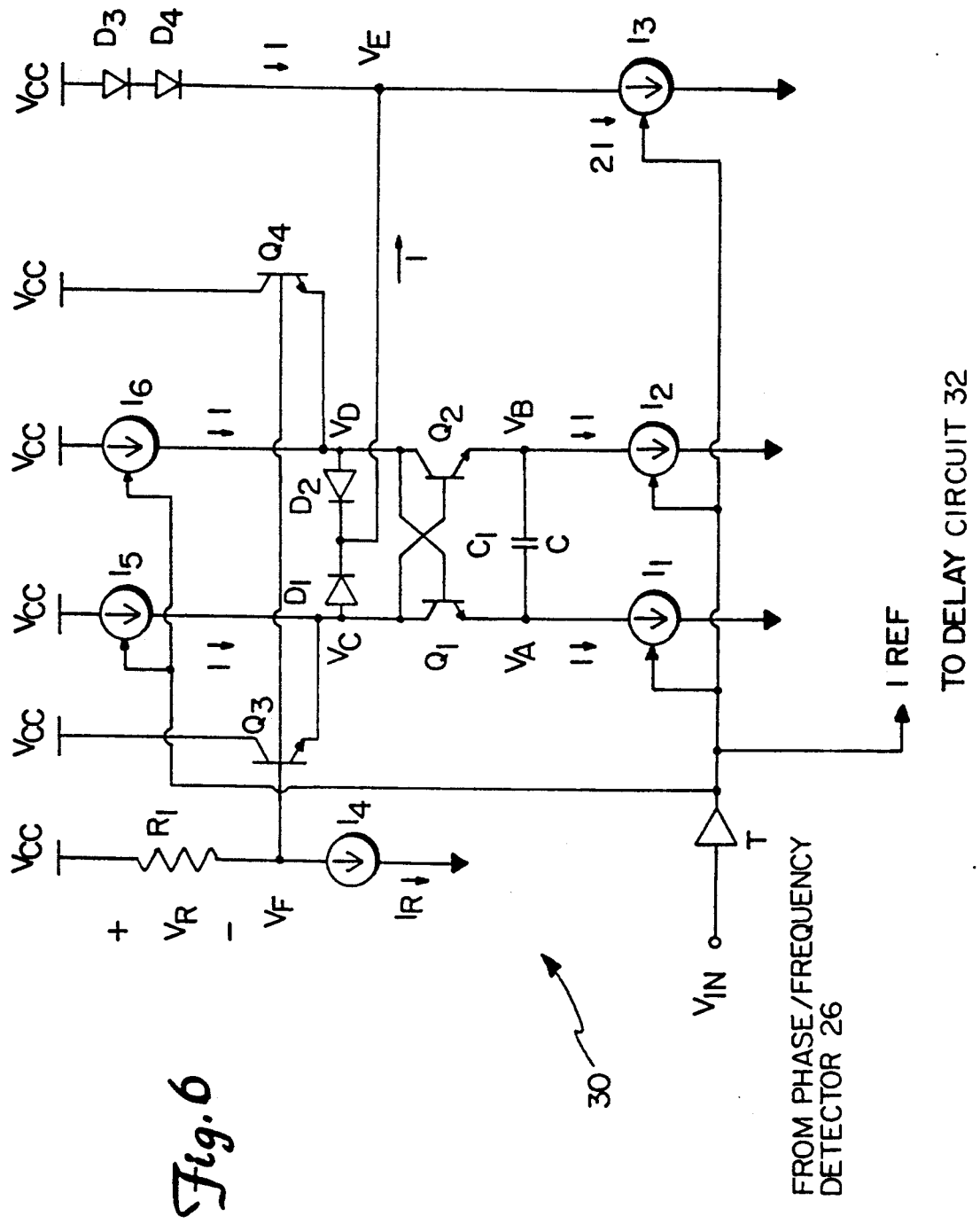
FIG. 6 a simplified transistor level diagram showing an embodiment of a VCO which is part of the frequency synthesizer of FIG. 1.

FIG. 6 a simplified transistor level diagram showing an embodiment of VCO 30 of FIG. 1. VCO 30 is comprised of resistor $R_1$, diodes $D_1$, $D_2$, $D_3$ and $D_4$, transistors $Q_1$, $Q_2$, $Q_3$, and $Q_4$, current sources $I_1$, $I_2$, $I_3$, $I_4$, $I_5$ and $I_6$, capacitor $C_1$ and transconductance amplifier T.

Transconductance amplifier T modulates current sources $I_1$, $I_2$, $I_3$, $I_5$ and $I_6$ based on a voltage $V_{IN}$ received from phase/frequency detector 26 of FIG. 1. The currents produced by current sources $I_1$, $I_2$, $I_5$ and $I_6$ are equal, With each current defined by:

$$I = K \cdot (V_{IN} - V_1), \qquad \text{Eq. 20}$$

where $V_1$ is an internal reference voltage and K is a transconductance constant. Current source $I_3$ is modulated to produce a current 2.I.

Transistors $Q_1$ and $Q_2$ form a regenerative feedback circuit such that only one of the transistors is on at a time. Transistors $Q_3$ and $Q_4$ mirror the states of transistors $Q_1$ and $Q_2$, respectively, so that when transistor $Q_1$ is on transistor $Q_3$ is on, and when transistor $Q_2$ is off transistor $Q_4$ is off. Conversely, when transistor $Q_1$ is off transistor $Q_3$ is off, and when transistor $Q_2$ is on transistor $Q_4$ is on. For the purpose of describing the circuit, it will be assumed that transistors $Q_1$ and $Q_3$ are initially on and transistors $Q_2$ and $Q_4$ are initially off.

With transistor $Q_2$ off, current I supplied by current source $I_6$ must pass through diode $D_2$ and current source $I_3$. Since current source $I_3$ is modulated to produce a current of 2.I, a current I also passes through diodes $D_3$ and $D_4$. The voltage at circuit node $V_E$ is $V_{CC}$ minus the voltage drops over diodes $D_3$ and $D_4$. In the technology used in the preferred embodiment of the present invention, a voltage drop over a diode is equal to the base-to-emitter drop of a transistor. Therefore, the voltage at node $V_E$ is:

$$V_E = V_{CC} - 2V_{BE}. \qquad \text{Eq. 21}$$

Since transistor $Q_2$ is off, the voltage at node $V_D$ is the voltage at node $V_E$ plus the voltage drop over diode $D_2$. The voltage at node $V_D$ is given by:

$$V_D = V_{CC} - 2V_{BE} + V_{BE} \qquad \text{Eq. 22}$$

or $$V_D = V_{CC} - V_{BE}. \qquad \text{Eq. 23}$$

A reference voltage created at node $V_F$ is applied to the bases of transistors $Q_3$ and $Q_4$ This reference voltage is created by current source $I_4$ pulling a current $I_R$ over resistor $R_1$. A voltage drop $V_R$ is formed over resistor $R_1$ such that the voltage at node $V_F$ is:

$$V_F = V_{CC} - V_R. \qquad \text{Eq. 24}$$

Current source $I_4$ and resistor $R_1$ are designed such that the voltage drop $V_R$ over resistor $R_1$ does not vary with temperature or power supply variations. Such designs are well known in the art. The resistance of resistor $R_1$ and current $I_R$ of current source $I_4$ are chosen such that:

$$V_R < V_{BE}. \qquad \text{Eq. 25}$$

Accordingly, transistor $Q_4$ remains off.

With transistor $Q_2$ off, transistor $Q_1$ conducts a current of 2.I; a current I through current source $I_1$ and a current I through current source $I_2$ via capacitor $C_1$. The voltage of node $V_B$ with respect to node $V_A$ will decrease by:

$$\frac{dV}{dT} = \frac{I}{C}. \qquad \text{Eq. 26}$$

Since a current of 2.I is flowing through transistor $Q_1$ and a current of I is flowing through current source $I_5$, a current I must also be flowing through transistor $Q_3$. Therefore, transistor $Q_3$ is on and the voltage at node $V_C$ is given by:

$$V_C = V_{CC} - V_R - V_{BE}. \qquad \text{Eq. 27}$$

Since the voltage at node $V_C$ is higher than the voltage at node $V_E$, diode $D_1$ is reverse-biased and is not conducting current.

The voltage at node $V_A$ is:

$$V_A = V_D - V_{BE} \qquad \text{Eq. 28}$$

or $$V_A = V_{CC} - 2V_{BE}. \qquad \text{Eq. 29}$$

The voltage at node $V_B$ will continue to ramp down until transistor $Q_2$ begins to conduct. Transistor $Q_2$ will begin conducting when:

$$V_B = V_C - V_{BE} \qquad \text{Eq. 30}$$

or $$V_B = V_{CC} - V_R - 2V_{BE}. \qquad \text{Eq. 31}$$

As transistor $Q_2$ begins to conduct, the voltage drop over current source $I_6$ begins to increase, causing the voltage at node $V_D$ to drop. When the voltage at node $V_D$ drops by $V_{BE}$, transistor $Q_1$ shuts off and transistor $Q_4$ turns on. When transistor $Q_1$ shuts off, the voltage drop over current source $I_5$ decreases. This decrease causes the voltage at node $V_C$ to increase, which reinforces the "on" state of transistor $Q_2$ and turns off transistor $Q_3$ Diode $D_1$ begins to conduct and diode $D_2$ becomes reverse biased. The current I which previously passed through diode $D_2$ now passes through diode $D_1$.

At this point, the original assumptions are reversed, transistors $Q_2$ and $Q_4$ are now on and transistors $Q_1$ and $Q_3$ are now off. Just before the transistors switched states, the voltages at nodes $V_A$ and $V_B$ were:

$$V_A = V_{CC} - 2V_{BE} \qquad \text{Eq. 32}$$

and $$V_B = V_{CC} - V_R - 2V_{BE}. \qquad \text{Eq. 33}$$

Therefore, $$V_A - V_B = V_R. \qquad \text{Eq. 34}$$

Just after the transistors switched, the voltage at node $V_B$ assumed the same voltage level previously found at node $V_A$, and the voltage over capacitor C1 was capacitively coupled to node $V_A$. Therefore the voltage at node $V_A$ is given by:

$$V_A = V_{CC} - 2V_{BE} + V_R. \qquad \text{Eq. 35}$$

The voltage at $V_A$ Will now decrease until:

$$V_A = V_{CC} - 2V_{BE} - V_R, \qquad \text{Eq. 36}$$

with the voltage at node $V_A$ dropping by $2 \cdot V_R$. At this point, the transistors will switch states, a complete cycle will have been completed and VCO 30 returns to the state set forth in the original assumption.

Figure 7:
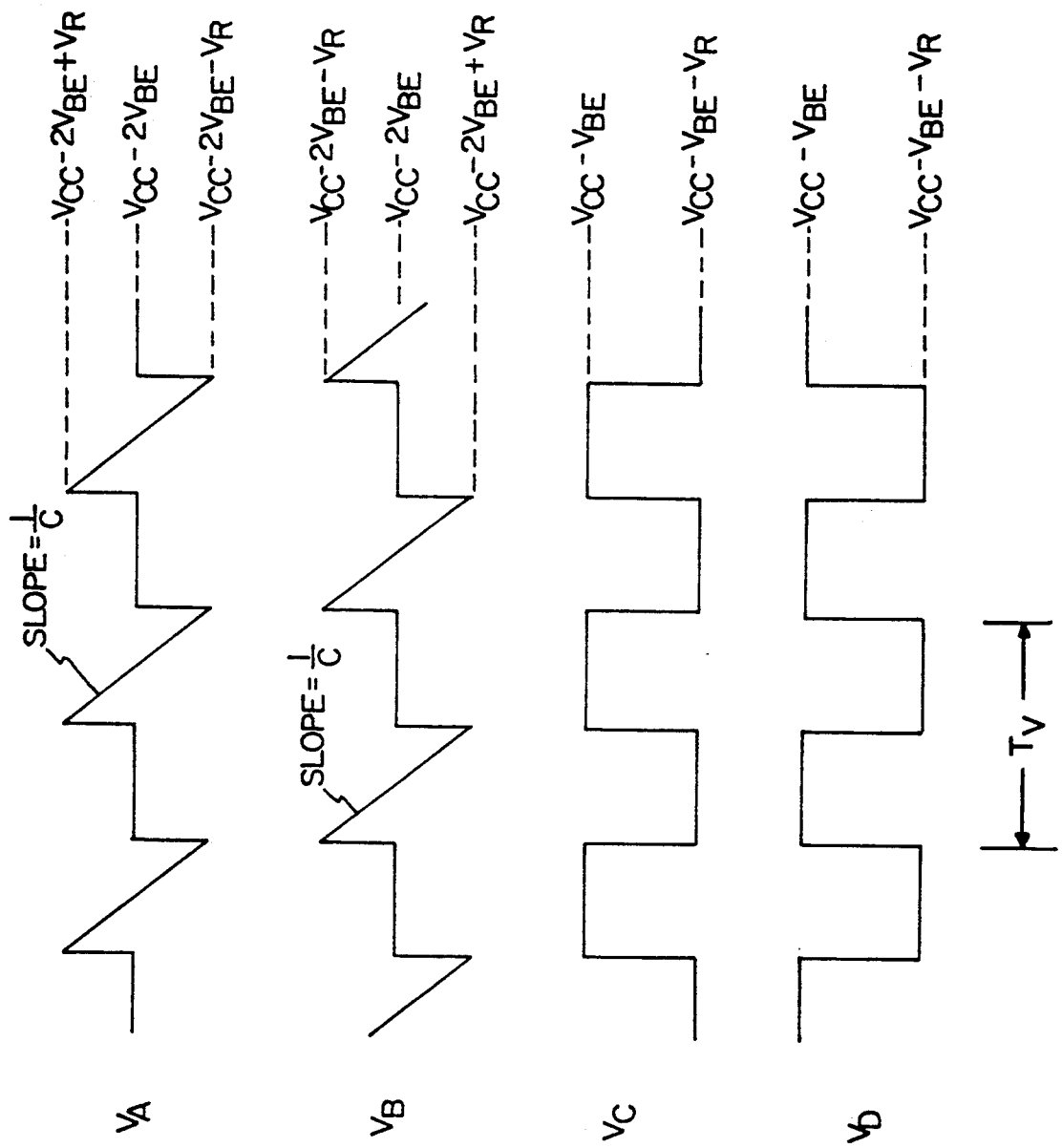
FIG. 7 is a timing diagram showing the voltages present at certain circuit nodes of the VCO of FIG. 6.

The waveforms present at nodes $V_A$, $V_B$, $V_C$ and $V_D$ While VCO 30 oscillates are shown in FIG. 7. As shown in FIG. 7, one-half of a period $T_V$ occurs when the voltage at node $V_A$ (or equivalently node $V_B$) drops by $2 \cdot V_R$. Therefore, $$\frac{dV_A}{dT} = \frac{DV_B}{dT} = \frac{2 \cdot V_R}{\left(\frac{T_V}{2}\right)}. \qquad \text{Eq. 37}$$

As described above, the rate at which the voltage drops is:

$$\frac{dV}{dt} = \frac{I}{C}. \qquad \text{Eq. 38}$$

Therefore, $$\frac{I}{C} = \frac{2 \cdot V_R}{\left(\frac{T_V}{2}\right)} \qquad \text{Eq. 39}$$

or $$T_V = \frac{4 \cdot V_R C}{I}. \qquad \text{Eq. 40}$$

Accordingly, the period of VCO 30 is directly proportional to the reference voltage $V_R$ and the capacitance C of capacitor C1, and inversely proportional to the current I. Through the action of the phase locked loop of frequency synthesizer 12 of FIG. 1, current I will be adjusted to cause VCO 30 to oscillate at a frequency dictated by oscillator 18 and dividers 20 and 22. As described above, the reference voltage $V_R$ is designed to be a constant. The capacitance C of capacitor C1 is typically subject to process variations of approximately 20 percent. However within any integrated circuit, the process variations between capacitors are much smaller, typically 0.1 to 0.5 percent. VCO 30 and delay cell 32 of FIG. 1 are on a common integrated circuit. Therefore, the current I can be used to accurately control delay circuit 32 because process variations in delay circuit 32 will track process variations in VCO 30.

Figure 8:
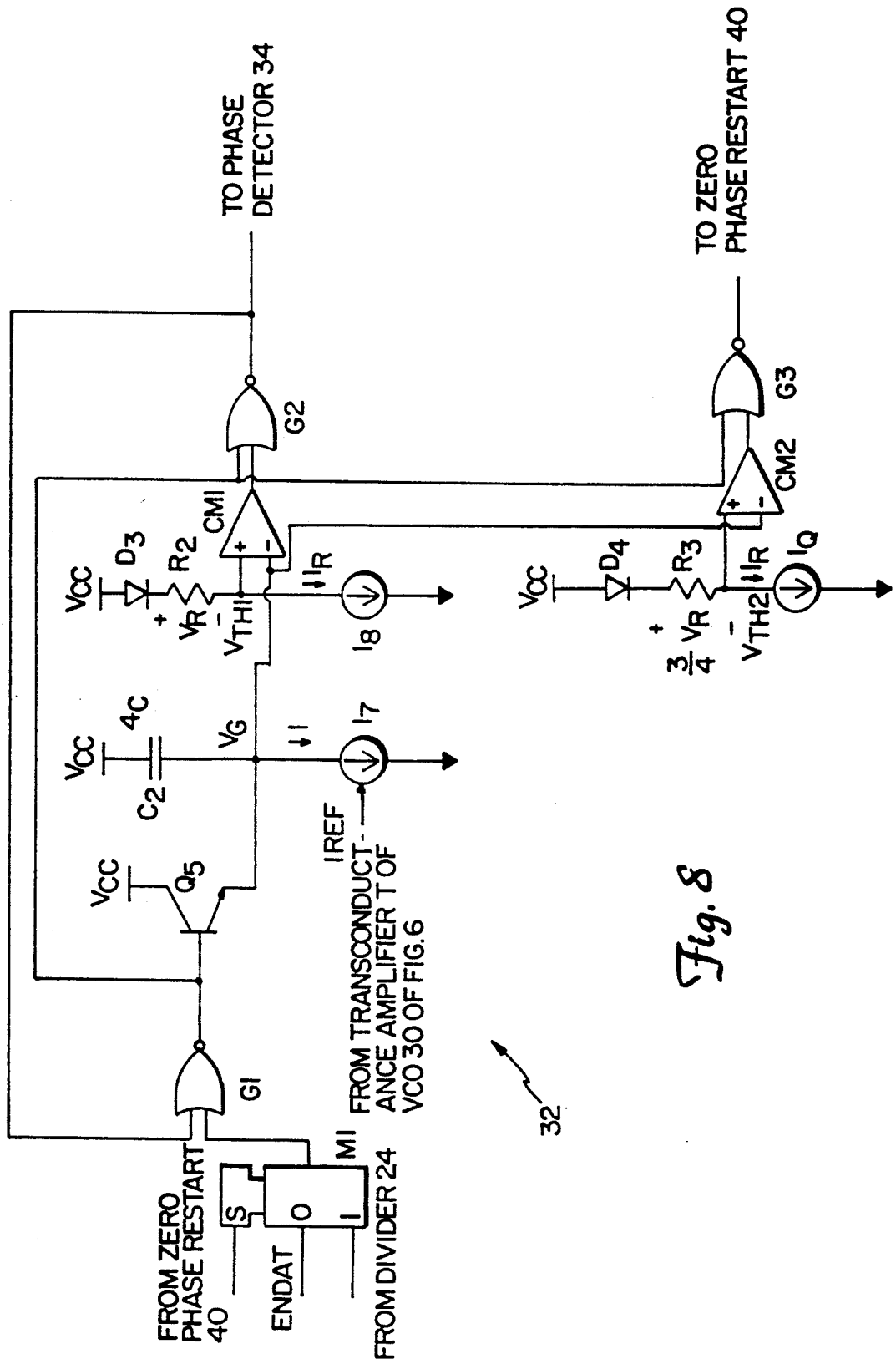
FIG. 8 is a transistor level diagram showing an embodiment of a delay circuit, which is part of the data separator of FIG. 1.

FIG. 8 is a transistor level diagram showing an embodiment of delay circuit 32 of FIG. 1. This embodiment receives the $I_{REF}$ signal produced by the embodiment of VCO 30 shown in FIG. 6. Delay circuit 32 is comprised of multiplexer $M_1$, NOR gates $G_1$, $G_2$ and $G_3$, transistor $Q_5$, capacitor $C_2$, current sources $I_7$, $I_8$ and $I_9$, diodes $D_3$ and $D_4$, resistors $R_2$ and $R_3$ and comparators $CM_1$ and $CM_2$. In this embodiment, capacitor $C_2$ has a capacitance four times larger than the capacitance C of capacitor $C_1$ of VCO 30.

Under control of zero phase restart 40, multiplexer $M_1$ selectively gates either the output of divider 24 or the ENDAT signal to gate $G_1$. For the purposes of describing delay circuit 32, assume that both inputs of gate $G_1$ are initially low. The inverted output of gate $G_1$ will be high. When gate $G_1$ is high, the voltage of its output is equal to $V_{CC}$. Therefore, transistor $Q_5$ will be on and node $V_G$ will have a voltage equal to:

$$V_G = V_{CC} - V_{BE}. \qquad \text{Eq. 41}$$

Diode $D_3$, resistor $R_2$ and current source $I_8$ produce a voltage drop $V_R$ over resistor $R_2$ equal to the Voltage drop $V_R$ over resistor $R_1$ in FIG. 6. Accordingly, a threshold voltage is formed at node $V_{TH1}$ having a value of:

$$V_{TH1} = V_{CC} - V_{BE} - V_R. \qquad \text{Eq. 42}$$

Since $$V_G > V_{TH1}, \qquad \text{Eq. 43}$$

the output of comparator $CM_1$ is low. The output of gate $G_2$ is low because of the high signal fed forward from the output of gate $G_1$. The output of gate $G_2$ is coupled to phase/frequency detector 34 of FIG. 1.

Diode $D_4$, resistor $R_3$ and current source $I_9$ produce a voltage drop over resistor $R_3$ equal to three-fourths of the voltage drop $V_R$ over resistor $R_1$ in FIG. 6. Accordingly, a threshold voltage is formed at node $V_{TH2}$ having a voltage of:

$$V_{TH2} = V_{CC} - V_{BE} - \tfrac{3}{4} V_R. \qquad \text{Eq. 44}$$

Since $$V_G > V_{TH2}, \qquad \text{Eq. 45}$$

the output of comparator $CM_2$ is also low. The output of gate $G_3$ is low because of the high signal fed forward from the output of gate $G_1$. The output of gate $G_3$ is coupled to zero phase restart 40 of FIG. 1.

When the output of multiplexer $M_1$ goes high, the output of gate $G_1$ goes low. This low output is fed forward to gates $G_2$ and $G_3$, causing their respective outputs to go high. The high output of gate $G_2$ is fed back to gate $G_1$, which causes the outputs of gates $G_2$ and $G_3$ to be latched high until released by comparators $CM_1$ and $CM_2$, respectively.

When gate $G_1$ goes low, transistor $Q_5$ turns off. Current source $I_7$, which is modulated by transconductance amplifier T of FIG. 6 to produce current I, will begin to pull down the voltage at node $V_G$ at a rate given by:

$$\frac{dV_G}{dT} = \frac{I}{4 \cdot C}. \qquad \text{Eq. 46}$$

At some point, the voltage at node $V_G$ will become less than the voltage at node $V_{TH2}$. At this point, the output of $CM_2$ will go high and the output of gate $G_3$ will go low. At a later point, the voltage at node $V_G$ will become less than the voltage at node $V_{TH1}$. At this point, the output of $CM_1$ will go high and the output of gate $G_2$ will go low. At this point, if the output of multiplexer $M_1$ is high, transistor $Q_5$ will turn on. If the output of multiplexer $M_1$ is not high, the voltage at node $V_G$ will continue to drop until the output of multiplexer $M_1$ goes high or the voltage of node $V_G$ drops low enough to turn transistor $Q_5$ back on.

In producing the delay interval required for phase detector 34, the voltage at node $V_G$ starts at:

$$V_G = V_{CC} - V_{BE}, \qquad \text{Eq. 47}$$

and drops to:

$$V_G = V_{TH1} = V_{CC} - V_{BE} - V_R. \qquad \text{Eq. 48}$$

Accordingly, the voltage drop is $V_R$. Since the rate at which the voltage at node $V_G$ drops is:

$$\frac{dV_G}{dT} = \frac{I}{4 \cdot C}, \qquad \text{Eq. 49}$$

the delay interval is:

$$\frac{4 \cdot V_R C}{I}. \qquad \text{Eq. 50}$$

This delay interval is equal to the oscillation period $T_V$ of VCO 30 (derived at Equation 40) and will remain equal for any selected oscillation frequency. With very little additional circuitry, delay circuit 32 provides an accurate delay interval by recreating the oscillation period of VCO 30.

FIG. 9 is a timing diagram showing the voltage at node $V_G$ and the outputs of gates $G_2$ and $G_3$ with respect to the output of multiplexer $M_1$. In FIG. 9, pulses 54, 56 and 58 from the output of multiplexer $M_1$ are of unequal duration.

Delay circuit 32 delays the leading edge of edge of the output of multiplexer $M_1$, with the delays reflected in the trailing edges of the outputs of gates $G_2$ and $G_3$. The rising edge of the output of gate $G_2$ notifies phase/frequency detector 34 of FIG. 1 that a phase comparison must be performed. The trailing edge of output gate $G_2$, which is the delayed edge, is the edge which is compared to an edge from divider 42 of FIG. 1.

With reference to FIGS. 8 and 9, the leading edge of pulse 54 causes the output of gate $G_1$ to go low, thereby turning off transistor $Q_5$ and latching the output of gates $G_2$ and $G_3$ high. The voltage at node $V_G$ begins to drop. Before the voltage at node $V_G$ drops to $V_{TH2}$, the output of multiplexer $M_1$ goes low. At this point, the outputs of gates $G_2$ and $G_3$ are held high by the feedback loop between gates $G_2$ and $G_1$. The voltage at $V_G$ continues to drop, with the output of $G_3$ going low when the voltage at node $V_G$ equals the voltage at node $V_{TH2}$ and the output of $G_2$ going low when the voltage at node $V_G$ equals the voltage at node $V_{TH1}$. When the output of gate $G_2$ goes low, the feedback loop between $G_1$ and $G_2$ is broken. Since the output of multiplexer $M_1$ is low, the output of gate $G_1$ is high and transistor $Q_5$ is turned back on.

Pulse 56 causes a similar response, except that pulse 56 does not go low until after the output of gate $G_2$ goes low. Therefore, the output of multiplexer $M_1$, not the feedback from gate $G_2$, turns transistor $Q_5$ on.

Pulse 58 also causes a similar response at gates $G_2$ and $G_3$. However, pulse 58 remains on so long that the voltage at node $V_G$ drops low enough to cause transistor $Q_5$ to turn back on.

The data separator of the present invention provides an improvement over the prior art by using a frequency synthesizer to control a delay circuit during read operations. Since the frequency synthesizer must be provided anyway to generate a write clock during write operations, very little additional circuitry is required to allow the frequency synthesizer to control the delay circuit during read operations. Not only does the frequency synthesizer accurately control the delay circuit, it also allows the delay interval of the delay circuit to be dynamically varied, which is required to support zone density recording.

By adding additional comparators coupled to different threshold voltages, any number of delay intervals can be derived from the delay circuit. Accordingly, the delay circuit can be constructed to provide any delay interval required of the transducer signal during a read operation.

In one embodiment, the delay circuit utilized in the present invention also provides a delayed transducer signal to a zero phase restart circuit. The zero phase restart circuit anticipates an impending phase comparison and starts the VCO such that the first transition in the signal derived from the VCO output signal coincides with the transition in the delayed read signal. Accordingly, the VCO is started in-phase which allows the data separator to quickly lock on to the read signal.

The delay circuit of the present invention also provides a significant design advantage. During design of the delay circuit, the resistance of a resistor which determines a threshold voltage can be changed without affecting other delay intervals provided by the delay circuit. Accordingly, if a prototype of an integrated circuit having the delay circuit of the present invention proves to have an error in a delay interval, the threshold voltage which determines that delay interval can by easily and accurately changed by changing the resistance of the resistor which determines the threshold voltage. The other delay intervals provided by the delay circuit will be unaffected by the resistance change and therefore will not require additional attention from the designer.

Although the present invention has been described with reference to preferred embodiments, workers skilled in the art will recognize that changes may be made in form and detail without departing from the spirit and scope of the invention

What is claimed is:

1. A data separator which responds to a read request signal by extracting data embedded in a read signal that is derived from a transducer signal generated by a transducer moving proximate a storage media, the data separator comprising:

first controlled oscillator means for producing a first oscillator output signal having a first oscillation frequency which varies in response to a first frequency control signal;

means for deriving a read clock signal having a read clock oscillation period from the first oscillator output signal;

delay means for receiving the read signal and producing a delayed read signal, the delay means comprising:

a frequency synthesizer which provides a write clock during write operations, the frequency synthesizer comprising:

reference frequency means for providing a frequency reference signal having a reference frequency;

second controlled oscillator means for producing a second oscillator output signal having a second oscillation frequency which varies with a magnitude of a second frequency control signal, the second controlled oscillator means also providing a delay control signal indicative of the magnitude of the second frequency control signal;

means for deriving a first signal from the frequency reference signal;

means for deriving a second signal from the second oscillator output signal; and first phase detection means for controlling a phase difference between the first and second signals by modulating the second frequency control signal; and variable delay means coupled to the delay control signal and residing on a common integrated circuit with the second controlled oscillator means, for delaying the read signal by a delay interval to produce the delayed read signal, wherein the delay interval is controlled by the delay control signal;

second phase detection means for controlling a phase difference between the delayed read signal and the read clock signal by modulating the first frequency control signal; and data extraction means for extracting data from the read signal by framing data in the read signal using the read clock signal.

2. The data separator of claim 1 wherein the reference frequency means comprises a crystal oscillator.

3. The data separator of claim 1 wherein the means for deriving a first signal from the frequency reference signal comprises a frequency divider which receives the frequency reference signal and produces the first signal, wherein the first signal has a frequency equal to the reference frequency divided by an integer A.

4. The data separator of claim 3 wherein the means for deriving a second signal from the second oscillator output signal comprises a second frequency divider which receives the second oscillator output signal and produces the second signal, wherein the second signal has a frequency equal to the second oscillation frequency of the second oscillator output signal divided by an integer B.

5. The data separator of claim 4 wherein the integers A and B are dynamically selectable to cause the second oscillation frequency of the second oscillator output signal to equal the reference frequency multiplied by the integer B and divided by the integer A.

6. The data separator of claim 1 wherein the second frequency control signal is a voltage signal.

7. The data separator of claim 6 wherein the second controlled oscillator means comprises:

transconductance amplification means, for receiving the voltage signal and producing a current I1;

a capacitance C1; and a regenerative feedback path which alternately charges and discharges the capacitance C1 between first and second voltages using the current I1.

8. The data separator of claim 7 wherein the variable delay means comprises:

means for producing a current I2 based on the delay control signal, wherein the current I2 has a known relationship to the current I1;

a capacitance C2 which is charged by the current I2 and has a known relationship to the capacitance C1; and a comparator which compares a voltage across the capacitance C2 with a threshold voltage, wherein the delayed read signal has a delay interval equal to an interval required to charge the second capacitance from a starting voltage to the threshold voltage.

9. The data separator of claim 1 wherein a difference between the first and second voltages is approximately equal to a difference between the starting voltage and the threshold voltage.

10. The data separator of claim 1 wherein the delay means delays the delayed signal by approximately one-half of the read clock signal oscillation period.

11. The data separator of claim wherein the means for deriving a read clock signal from the first oscillator output signal comprises a frequency divider which receives the first oscillator output signal and produces the read clock signal, wherein the read clock signal has a frequency equal to the first oscillation frequency divided by an integer N.

12. The data separator of claim 11 wherein N is one.

13. The data separator of claim 11 wherein N is two.

14. The data separator of claim and further comprising:

phase comparison anticipation means for signaling the second phase detection means to perform a phase comparison based on a transition from one signal level to another second signal level in the read signal.

15. The data separator of claim wherein the delay means further comprises:

means for deriving a synthesizer clock from second oscillator means;

means for generating a select signal from the read request signal; and multiplexer means for receiving the select signal and selectively coupling either the synthesizer clock or the read signal to the variable delay means.

16. The data separator of claim wherein the first controlled oscillator means is responsive to a stop signal which stops oscillation and a start signal which starts oscillation, wherein a start interval exists between assertion of the start signal and oscillation of the first controlled oscillator means.

17. The data separator of claim 16 wherein the variable delay means of the delay means produces a second delayed signal.

18. The data separator of claim 17 and further comprising:

restart means responsive to the read request signal and the first named delayed signal, for asserting the stop signal based on the read request signal and thereafter asserting the start signal based on a transition from one signal level to another signal level in the first named delayed signal.

19. The data separator of claim 18 wherein the second delayed signal is delayed with respect to the first named delayed signal by an interval approximately equal to the start interval to cause the first oscillator output signal to start oscillating in a desired phase relationship with the second delayed signal upon assertion of the start signal.

20. The data separator of claim 19 wherein the start interval is approximately one-fourth of a first oscillation frequency period of the first oscillator output signal.

21. On an integrated circuit having a frequency synthesizer which provides a write clock during write operations and having a data separator which responds to a read request signal by extracting data embedded in a read signal, the read signal derived from a transducer signal which is generated by a transducer moving proximate a storage media, wherein the data separator comprises:

first controlled oscillator means for producing a first oscillator output signal having a first oscillation frequency which varies in response to a first frequency control signal;

means for deriving a read clock signal from the oscillator output signal;

variable delay means for receiving the read signal and producing a delayed read signal which is delayed by a delay interval;

first phase detection means for controlling a phase difference between the delayed read signal and the read clock signal by modulating the first frequency control signal; and data extraction means for extracting data from the read signal by framing data in the read signal using the read clock signal; and wherein the frequency synthesizer comprises:

reference frequency means for providing a frequency reference signal having a reference frequency;

second controlled oscillator means for producing a second oscillator output signal having a second oscillation frequency which varies with a magnitude of a second frequency control signal;

means for deriving a first signal from the frequency reference signal;

means for deriving a second signal from the second oscillator output signal; and second phase detection means for controlling a phase difference between the first and second signals by modulating the second frequency control signal;

the improvement comprising:

means for providing a delay control signal indicative of the magnitude of the second frequency reference signal; and means for controlling the delay interval of the variable delay means based on the delay control signal.

22. In a disk drive which includes a transducer that moves relative to a magnetic disk and provides a transducer signal from which a read signal is derived, the read signal indicative of data stored on the magnetic disk, and a data separator that extracts data from the read signal and that recovers a read clock signal based on a controlled oscillator signal from a first controlled oscillator in the data separator, wherein the data separator includes a variable delay circuit for variably delaying the read signal by a delay interval, and phase control means for controlling a phase difference between the delayed read signal and the read clock signal, and wherein the disk drive includes a frequency synthesizer which provides a write clock during write operations based on a second oscillation signal from a second controlled oscillator in the frequency synthesizer, the second oscillation signal having a frequency based on a frequency control signal, an improvement comprising:

delay signal means, coupled to the second controlled oscillator, for providing a delay control signal based on the frequency control signal; and means, coupled to the variable delay cell and the delay signal means, for controlling the delay interval of the variable delay circuit based on the delay control signal.

* * * * *

UNITED STATES PATENT AND TRADEMARK OFFICE
CERTIFICATE OF CORRECTION

PATENT NO. : 5,260,842

DATED : November 9, 1993

INVENTOR(S) : WILLIAM W. LEAKE, THOMAS J. SKAAR

It is certified that error appears in the above-identified patent and that said Letters Patent is hereby corrected as shown below:

Col. 7, line 57, delete "Voltages", insert --voltages--

Col. 7, line 64, after "noise", insert --in--

Col. 8, line 4, after "$V_{A1}$", insert --=--

Col. 9, line 28, delete "$I=K.(V_{IN}-V_1)$,    Eq. 20
insert --$I = K \cdot (V_{IN} - V_1)$,    Eq. 20

Col. 9, line 32, delete "2.I", insert --2 · I--

Col. 9, line 46, delete "2.I", insert --2 · I--

Col. 10, line 17, delete "2.I", insert --2 · I--

Col. 10, line 25, delete "2.I", insert --2 · I--

UNITED STATES PATENT AND TRADEMARK OFFICE
CERTIFICATE OF CORRECTION

PATENT NO. : 5,260,842

DATED : November 9, 1993

INVENTOR(S) : WILLIAM W. LEAKE, THOMAS J. SKAAR

It is certified that error appears in the above-identified patent and that said Letters Patent is hereby corrected as shown below:

Col. 10, line 42, delete "$V_A = V_{cc} - 2V_{BE}$    Eq. 29"

Insert --$V_A = V_{cc} - 2 \cdot V_{BE}$.    Eq. 29--

Col. 10, line 51 delete "$V_B = V_{cc} - V_R - 2V_{BE}$    Eq. 31

Insert -- $V_B = V_{cc} - V_R - 2 \cdot V_{BE}$.    Eq. 31

Col. 10, line 61, after $Q_3$, insert --.--

Col. 11, lines 1-6, delete " $V_A = V_{cc} - 2.V_{BE}$    Eq. 32 and $V_B = V_{cc} - V_R - 2.V_{BE}$    Eq. 33

Insert -- $V_A = V_{cc} - 2 \cdot V_{BE}$    Eq. 32 and $V_B = V_{cc} - V_R - 2 \cdot V_{BE}$.    Eq. 33

UNITED STATES PATENT AND TRADEMARK OFFICE
CERTIFICATE OF CORRECTION

PATENT NO. : 5,260,842
DATED : November 9, 1993
INVENTOR(S) : WILLIAM W. LEAKE, THOMAS J. SKAAR It is certified that error appears in the above-identified patent and that said Letters Patent is hereby corrected as shown below:

Col. 11, line 17, delete "$V_A = V_{cc} - 2.V_{BE} + V_R$    Eq. 35"

insert --$V_A = V_{cc} - 2 \cdot V_{BE} + V_R$    Eq. 35--

Col. 11, line 19, delete "Will", insert --will--

Col. 11, line 21, delete "$V_A = V_{cc} - 2.V_{BE} - V_R$,    Eq. 36 insert --$V_A = V_{cc} - 2 \cdot V_{BE} - V_R$,    Eq. 36

Col. 11, line 23, delete " $2.V_R$." insert --$2 \cdot V_R$·

Col. 11, line 28, delete "While", insert --while--

Col. 11, line 30, delete "$2.V_R$.", insert --$2 \cdot V_R$.

Col. 11, lines 40-42, delete "$\frac{dV}{dt} = \frac{I}{C}$·    Eq. 38 insert --$\frac{dV}{dT} = \frac{I}{C}$.    Eq. 38

UNITED STATES PATENT AND TRADEMARK OFFICE
CERTIFICATE OF CORRECTION

PATENT NO. : 5,260,842

DATED : November 9, 1993

INVENTOR(S) : WILLIAM W. LEAKE, THOMAS J. SKAAR

It is certified that error appears in the above-identified patent and that said Letters Patent is hereby corrected as shown below:

Col. 12, line 27, delete "Voltage", insert --voltage--

Col. 13, line 68, delete "Output", insert --output--

Col. 16, line 13, delete "current II", insert --current I1--

Col. 16, line 30, delete "claim", insert --claim 1--

Col. 16, line 37, delete "claim 1I', insert --claim 11--

Col. 16, line 38, delete "claim 1I", insert --claim 11--

Col. 16, line 39, delete "claim", insert --claim 1--

Col. 16, line 46, delete "claim", insert --claim 1--

Col. 16, line 55, delete "claim", insert --claim 1--

Signed and Sealed this

Twelfth Day of July, 1994

Attest:

BRUCE LEHMAN

Attesting Officer

Commissioner of Patents and Trademarks